(12) United States Patent
Norouzi et al.

(10) Patent No.: US 11,797,839 B2
(45) Date of Patent: Oct. 24, 2023

(54) TRAINING NEURAL NETWORKS USING PRIORITY QUEUES

(71) Applicant: Google LLC, Mountain View, CA (US)

(72) Inventors: Mohammad Norouzi, Sunnyvale, CA (US); Daniel Aaron Abolafia, Sunnyvale, CA (US); Quoc V. Le, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 1213 days.

(21) Appl. No.: 16/174,126

(22) Filed: Oct. 29, 2018

(65) Prior Publication Data

US 2019/0130267 A1 May 2, 2019

Related U.S. Application Data

(60) Provisional application No. 62/578,355, filed on Oct. 27, 2017.

(51) Int. Cl.
*G06N 3/08* (2023.01)
*G06N 3/04* (2023.01)
*G06N 3/044* (2023.01)

(52) U.S. Cl.
CPC ............ *G06N 3/08* (2013.01); *G06N 3/044* (2023.01)

(58) Field of Classification Search
CPC ....................................................... G06N 3/08
See application file for complete search history.

(56) References Cited

U.S. PATENT DOCUMENTS

| 2017/0024643 | A1 | 1/2017 | Lillicrap et al. |
| 2017/0076201 | A1 | 3/2017 | Van Hasselt et al. |
| 2021/0110271 | A1* | 4/2021 | Gendron-Bellemare ............. G06N 3/084 |

FOREIGN PATENT DOCUMENTS

| CN | 102413378 A | 4/2012 |
| CN | 105637540 A | 6/2016 |
| CN | 106462801 A | 2/2017 |

OTHER PUBLICATIONS

Andreas et al. "Learning to compose neural networks for question answering," arXiv 1601.01705v4, Jun. 7, 2016, 10 pages.
Angulin. "Learning regular sets form queries and counterexamples," Information and Computation 75(2), Nov. 1987, 20 pages.
(Continued)

*Primary Examiner* — Moazzam Hossain
(74) *Attorney, Agent, or Firm* — Fish & Richardson P.C.

(57) ABSTRACT

Methods, systems, and apparatus, including computer programs encoded on computer storage media, for training a neural network using a priority queue. One of the methods includes maintaining data identifying a set of K output sequences that were previously generated; selecting at least one of the output sequences from the set of output sequences; for each selected output sequence, determining a respective score; determining, for each selected sequence, a respective first update to the current values of the controller parameters; generating a batch of new output sequences using the controller neural network; obtaining a respective reward for each of the new output sequences; determining, from the new output sequences and the output sequences in the maintained data, the K output sequences that have the highest rewards; and modifying the maintained data.

20 Claims, 3 Drawing Sheets

(56) References Cited

OTHER PUBLICATIONS

Balog et al. "Deepcoder: Learning to write programs," arXiv 1611.01989v2, Mar. 8, 2017, 21 pages.
Becker et al. "AI Programmer: Autonomously creating software programs using genetic algorithms," arXiv 1709.05703, Sep. 17, 2017, 11 pages.
Bello et al. "Neural Combinatorial optimization with reinforcement learning," arXiv 1611.09940v3, Jan. 12, 2017, 15 pages.
Beltramelli. "Pix2code: generating code from a graphical user interface screenshot," arXiv 1705.07962v2, Sep. 19, 2017, 9 pages.
Bhoopchang et al. "Learning python code suggestion with a sparse pointer network," arXiv 1611.08307, Nov. 24, 2016, 11 pages.
Bunel et al. "Adaptive neural compilation," NIPS, Dec. 2016, 9 pages.
Cai et al. "Making neural programming architectures generalize via recursion," arXiv 1704.06611, Apr. 21, 2017, 20 pages.
Devlin et al. "RobustFill: Neural program learning under noisy I/O," arXiv 1703.07469, Mar. 21, 2017, 18 pages.
Gaunt et al. "TerpreT: a probabilistic programming language for program induction," arXiv 1608.04428, Aug. 15, 2016, 50 pages.
Graves et al. "Neural Turing machines," arXiv 1410.5401v2, Dec. 10, 2014, 26 pages.
Graves et al. "Hybrid computing using a neural network with dynamic external memory," Nature 538(7626), Oct. 2016, 21 pages.
Gulwani et al. "Dimension in program synthesis," Proceedings of the 12$^{th}$ International ACMSIGPLAN Symposium on Principles and practice of declarative programming, Sep. 2010, 12 pages.
Guu et al. "From language to programs: Bridging reinforcement learning and maximum marginal likelihood," arXiv 1704.07926, Apr. 25, 2017, 12 pages.
Hochreiter et al. "Long short-term memory," Neural Computation, Nov. 15, 1997, 32 pages.
Hu et al. "Learning to reason: End-to-end module networks for visual question answering," arXiv 1704.05526v3, Sep. 11, 2017, 10 pages.
Johnson et al. "Inferring and executing programs for visual reasoning," arXiv 1705.03633, May 10, 2017, 13 pages.
Johnson et al. "Googles multilingual neural machine translation system: Enabling zero-shot translation," arXiv 1611.04558v2, Aug. 21, 2017, 17 pages.
Joulin et al. "Inferring algorithmic patterns with stack-augmented recurrent nets," NIPS, Dec. 2015, 9 pages.
Kaiser et al. "Neural GPUs learn algorithms," arXiv 1511.08228v3, Mar. 15, 2016, 9 pages.
Khanh Dam et al. "A deep language model for software code," arXiv 1608.02715, Aug. 9, 2016, 4 pages.
Kurach et al. "Neural random-access machines," arXiv 1511.06392v3, Feb. 9, 2016, 17 pages.
Lake et al. "Human-level concept learning through probabilistic program induction," Science, Dec. 2015, 8 pages.
Liang et al. "Neural symbolic machines: Learning Semantic parser of freebase with weak supervision," arXiv 1611.0020v4, Apr. 23, 2017, 12 pages.
Liang et al. "Learning programs: a hierarchical Bayesian approach," ICML, Jun. 2010, 8 pages.
Miceli Barone et al. "A parallel corpus of python functions and documentation string for automated code documentation and code generation," arXiv 1707.02275, Jul. 7, 2017, 5 pages.
Mnih et al. "Asynchronous methods for deep reinforcement learning," arXiv 1602.01783v2, Jun. 16, 2016, 19 pages.
Muggleton et al. "Inductive Logic Programming: Theory and Methods," the Journal of Logic Programming, May 19, 1994, 51 pages.
Murali et al. "Bayesian sketch learning for program synthesis," arXiv 1703.05698v5, Apr. 12, 2018, 17 pages.
Nachum et al. "Improving policy gradient by exploring under-appreciated rewards," arXiv 1611.09321v3, Mar. 15, 2017, 17 pages.
Nachum et al. "Bridging the gap between value and policy based reinforcement learning," NIPS Dec. 2017, 11 pages.
Neelakantan et al. "Neural programmer: Inducing latent programs with gradient descent," arXiv 1511.04834v3, Aug. 4, 2016, 18 pages.
Neelakantan et al. "Learning a natural language interface with neural programmer," arXiv 1611.08945v4, Mar. 2, 2017, 13 pages.
Parisotto et al. "Neuro-symbiotic program synthesis," arXiv 1611.01855, Nov. 6, 2016, 14 pages.
Rabinovich et al. "Abstract syntax networks for code generation and semantic parsing," arXiv1704.07535, Apr. 25, 2017, 11 pages.
Reed et al. "Neural programmer-interpreters," arXiv 1511.06279v4, Feb. 29, 2016, 13 pages.
Riedel et al. "Programming with a differentiable forth interpreter," arXiv 1605.06640v3, Jul. 23, 2017, 18 pages.
Schaechtle et al. "Time series structure discovery via probabilistic program synthesis," arXiv 1611.07051v3, May 22, 2017, 9 pages.
Szita et al. "Learning Tetris using the noisy cross-entropy method," Neural Computation, 18(12), Dec. 2006, 7 pages.
Vigueras et al. "Towards automatic learning of heuristics for mechanical transformation of procedural code," arXiv 1701.07123, Jan. 25, 2017, 16 pages.
Vinyals et al. "Pointer networks," NIPS, Dec. 2015, 9 pages.
Williams "Simple statistical gradient-following algorithms for connectionist reinforcement learning algorithms," Machine Learning, May 1992, 28 pages.
Williams "Function optimization using connectionist reinforcement learning algorithms," Connection Science, Jan. 1991, 29 pages.
Wu et al. "Google's neural machine translation system: Bridging the gap between human and machine translation," arXiv 1609.08144v2, Oct. 8, 2016, 23 pages.
Yin et al. "A syntactic neural model for general-purpose code generation," arXiv 1704.01696, Apr. 6, 2017, 14 pages.
Zaremba t al. "Learning to execute," arXiv 1410.4615v3, Feb. 19, 2015, 25 pages.
Zaremba et al. "Learning simple algorithms from examples," ICML, Jun. 11, 2016, 9 pages.
Zoph et al. "Neural architecture search with reinforcement learning," arXiv 1611.01578v2, 16 pages.
Office Action in Chinese Appln. No. 201811268001.9, dated Dec. 5, 2022, 8 pages (with English Translation).
Gruslys et al., "The Reactor: A Sample-Efficient Actor-Critic Architecture," arXiv, Apr. 15, 2017, 12 pages.
Li et al., "Reinforcement learning approach to ABR traffic control of ATM networks," Journal of Northeastern University, Jan. 15, 2008, 4 pages (with English Abstract).
Office Action in Chinese Appln. No. 201811268001.9, dated May 30, 2023, 18 pages (with English Translation).
Shuang et al., "Survey of current progress in random neural network," Control Theory & Application, Dec. 25, 2004, 7 pages (with English Abstract).

\* cited by examiner

TRAINING NEURAL NETWORKS USING PRIORITY QUEUES

CROSS-REFERENCE TO RELATED APPLICATION

This application claims priority to U.S. Provisional Application No. 62/578,355, filed on Oct. 27, 2017. The disclosure of the prior application is considered part of and is incorporated by reference in the disclosure of this application.

BACKGROUND

This specification relates to training neural networks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

Some neural networks are recurrent neural networks. A recurrent neural network is a neural network that receives an input sequence and generates an output sequence from the input sequence. In particular, a recurrent neural network can use some or all of the internal state of the network from a previous time step in computing an output at a current time step.

SUMMARY

This specification describes a system implemented as computer programs on one or more computers in one or more locations that selects a text span from an input electronic document that answers an input question that includes a plurality of question tokens.

The subject matter described in this specification can be implemented in particular embodiments so as to realize one or more of the following advantages.

In many neural network training scenarios, a ground truth output, i.e., a high quality output that should be generated by the neural network, is not available at the beginning of the training process. Examples of such scenarios include when a neural network is being trained to generate outputs that define neural network architectures or training hyperparameters for another neural network performing a particular task. As another example, this may occur when the neural network is being trained to synthesize computer programs, i.e., to generate a sequence of computer program tokens that defines a computer program to be executed to perform a particular computer programming task. As a more generalized example, all of three of the above scenarios can be seen as an attempt to use a neural network to guide a search through an appropriate output space to discover a high quality output sequence, i.e., to use the neural network to generate candidate outputs which then need to be evaluated. In all of these examples, while it is possible to ascertain whether a given output sequence is high quality, i.e., by evaluating the performance of the other neural network or by executing the computer program to check the output of the computer programming task, it is often not known a priori which sequences will result in high performance.

Because of this, the training cannot be performed using conventional supervised learning techniques. Instead, reinforcement learning, e.g., policy gradient, approaches are frequently used. In such techniques, during training, the neural network "explores" the space of possible output sequences to gradually identify high quality sequences based on a reward signal. However, such exploration is computationally expensive and consumes a large amount of time. That is, existing techniques for training neural networks in such circumstances consume a large amount of computational resources and wall clock time.

The described techniques, on the other hand, maintain a priority queue of the highest performing sequences throughout the training and leverage this queue in updating the parameters of the network. In so doing, the described system greatly reduces the time and amount of computational resources required to train the neural network to generate high quality output sequences. In other words, the system can effectively train the neural network to generate high quality output sequences for a particular task without requiring any sequences that have already been classified as performing well on the particular task and can do so in a much more computationally efficient manner than other techniques.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes a system implemented as computer programs on one or more computers in one or more locations that trains a controller neural network to generate output sequences.

The controller neural network can be configured to generate any of a variety of output sequences.

For example, an output sequence can be a sequence of computer program tokens that defines a computer program to be executed to perform a particular computer programming task. That is, each output sequence generated by the controller neural network can include a respective token in a particular computer programming language and the tokens can collectively define a computer program that is executable to perform a particular task.

As another example, an output sequence can be a sequence of values of neural network architecture hyperparameters that define an architecture for performing a particular neural network task. That is, each output sequence generated by the controller neural network can include, at each of multiple time steps, a respective value for the hyperparameter corresponding to the time step, e.g., size of convolutional filters, type of activation function, which layers a given layer receives input from, and so on.

As another example, an output sequence can be a sequence of values of hyperparameters of a machine learning training process that is to be used to train a neural network to perform a particular neural network task. That is, each output sequence generated by the controller neural network can include, at each of multiple time steps, a respective value for the hyperparameter of the training hyperparameters corresponding to the time step. For example the training hyperparameters can include hyperparameters that define an update rule, hyperparameters that define relative weights for one or more loss terms, hyperparameters that define an initialization scheme for network parameters, and so on.

Figure 1:
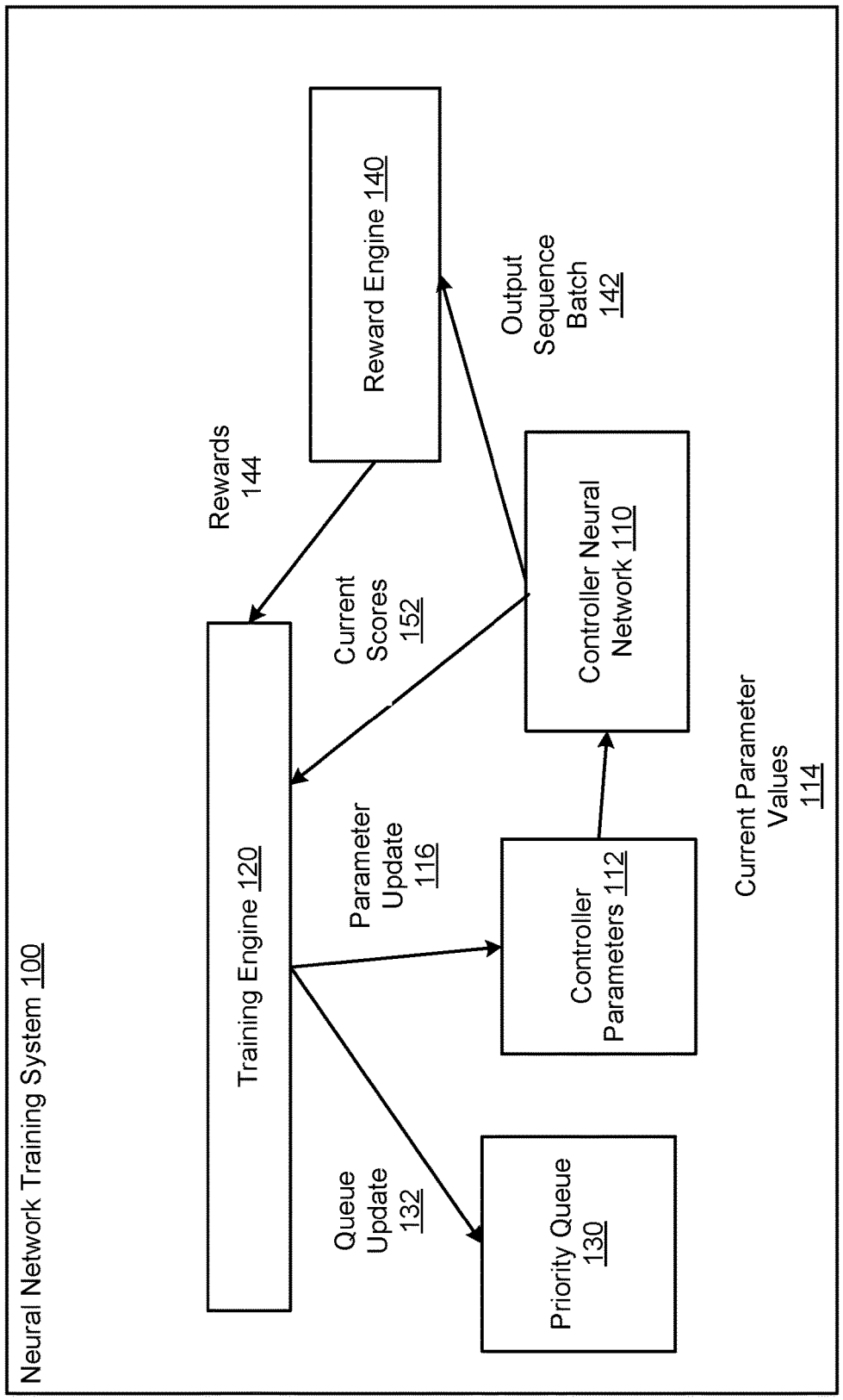
FIG. 1 shows an example neural network training system.

FIG. 1 shows an example neural network training system 100. The neural network training system 100 is an example of a system implemented as computer programs on one or more computers in one or more locations, in which the systems, components, and techniques described below are implemented.

The neural network training system 100 trains a controller neural network 110 having parameters 112 (referred to in this specification as "controller parameters") that generates output sequences. As described above, the controller neural network 110 can be configured to generate any of a variety of output sequences.

In particular, in some implementations, the controller neural network 110 is a recurrent neural network that generates an output sequence time step by time step. At each time step, the recurrent neural network is configured to receive as input a preceding output in the output sequence and process the preceding output in accordance with the controller parameters to generate a score distribution over possible outputs at the time step. The system 100 then selects the output at the time step by sampling from the score distribution or selecting the highest scoring possible output. Generally, however, the controller neural network can be any kind of neural network that generates an output defining a respective score distribution over possible outputs for each time step in an output sequence. Examples of other types of neural networks include self-attention based neural networks and convolutional neural networks.

The system 100 trains the controller neural network 110 to determine trained values of the controller parameters 112 from initial values of the controller parameters 112 using an iterative training process.

At each iteration of the training process, a training engine 120 in the system 100 applies a parameter value update 116 to the current controller parameter values 114 as of the iteration.

To improve the effectiveness of the training, the system 100 maintains a priority queue 130. At any given iteration of the training process, the priority queue 130 includes data identifying a set of K output sequences that were previously generated by the controller neural network 110 during the training and, for each output sequence in the set, a respective reward that measures a quality of the output sequence. Generally, K is fixed integer greater than one, e.g., five, ten, or twenty. The priority queue 130 can be initialized empty at the beginning of the training process or can be initialized with K random or default sequences.

At each iteration, the system 100 causes the controller neural network to generate a batch 142 of new output sequence in accordance with the current controller parameter values 114.

A reward engine 140 then determines a respective reward 144 for each new output sequence. The reward for a given output sequence is a numeric value that measures the quality of the output sequence, i.e., relative to the task that the controller neural network 110 is being trained to perform.

In some implementations, the reward engine 140 provides each new output sequence to an external system for evaluation and obtains the reward for the sequence from the external system.

In other implementations, the reward engine 140 evaluates the quality of each new output sequence to determine the reward for the output sequence.

For example, when the output sequence defines an architecture for a neural network for a target task, the reward engine 140 can train, e.g., for a predetermined number of training iterations or training epochs, an instance of a neural network having an architecture defined by the output sequence and then determine, as the reward, the accuracy of the trained neural network on a test set of data.

As another example, when the output sequence defines a computer program, the program code defined by the sequence is executed on one or more test cases sampled from the computer programming task (separate execution for each test input). Each test case is scored based on the program's output and the scores are summed to compute the final reward for the program, i.e., for the sequence.

As another example, when the output sequence defines hyperparameters for a neural network training process for a target neural network, the reward engine 140 can train the target neural network with the hyperparameters defined by the output sequence and then determine, as the reward, the accuracy of the trained neural network on a test set of data.

The training engine 120 uses the generated rewards 144 and the data maintained in the priority queue 130 to determine controller parameter value update 116 for the iteration and to determine an update 132 to the data maintained in the priority queue. Updating the priority queue and updating the controller parameters at a given iteration is described in more detail below with reference to FIGS. 2 and 3.

By iteratively updating the data maintained in the queue and the controller parameters, the system 100 can effectively train the controller neural network 110 to generate high quality output sequences.

Some tasks require a final output sequence to be generated, i.e., rather than continuing to use the controller neural network 110 to generate new output sequences after training has completed. For these tasks, after the training has completed, e.g., after a threshold number of iterations have been completed or after the controller parameter values have been determined to have converged, the system 100 can select the output sequence in priority queue 130 that has the highest reward as the final output sequence for the task.

While FIG. 1 shows only a single training engine 140 communicating with a single instance of the controller neural network and a single priority queue, in some implementations the training process can be distributed. In particular, to speed up the training, an asynchronous distributed setup can be employed, where a parameter server stores the shared model parameters for a number of controller neural network replicas. The training engine for each network replica asynchronously samples a batch of sequences from its local network replica and computes the gradients described below. Then, the gradients are sent to the parameter server, which asynchronously updates the shared parameters. The replicas periodically update their local parameter values with up-to-date parameters from the parameter server. Each replica has its own priority queue of size K.

Figure 2:
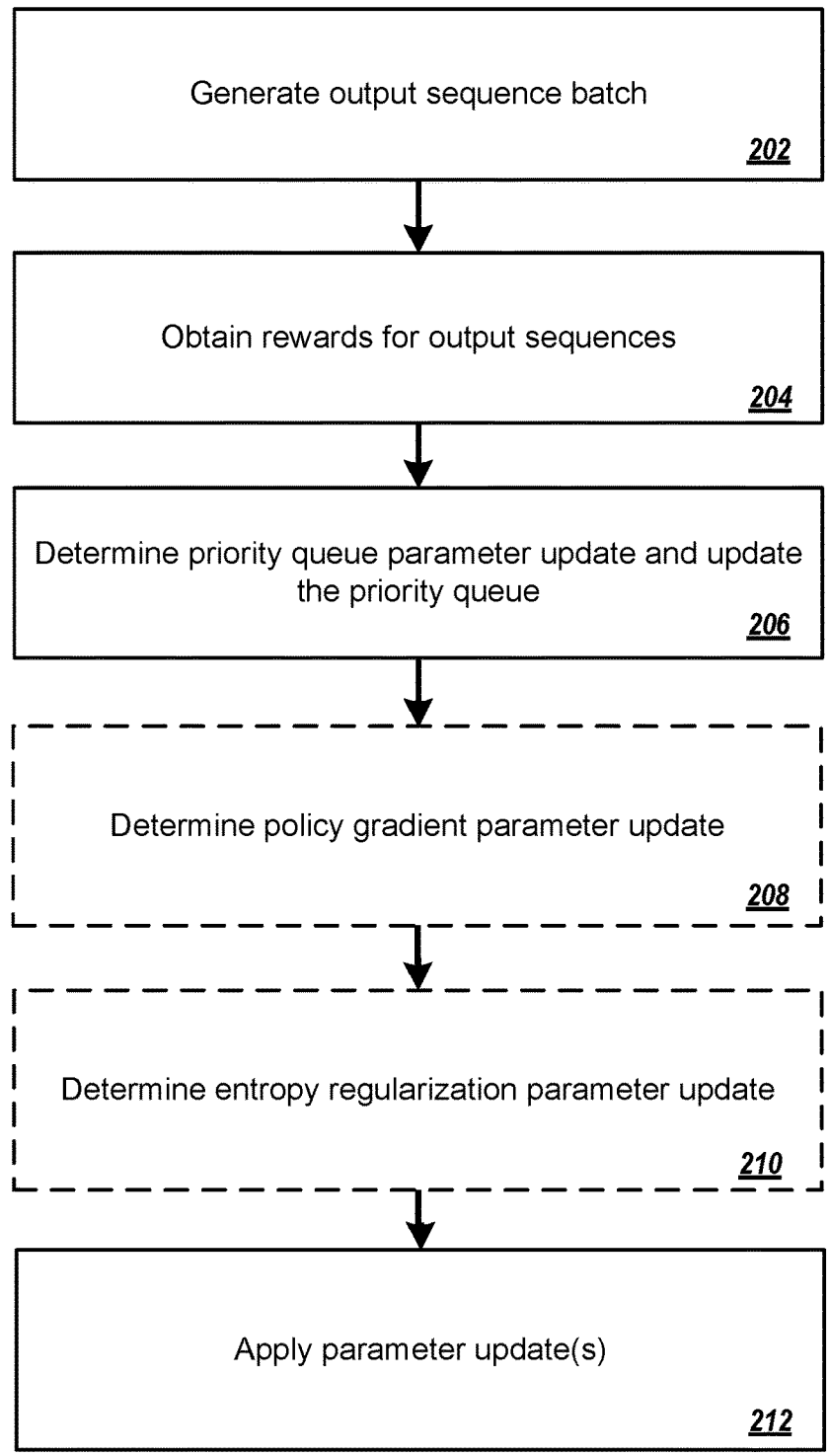
FIG. 2 is a flow chart of an example process for a training iteration during the training of the controller neural network.

FIG. 2 is a flow diagram of an example process 200 for training the controller neural network system. For convenience, the process 200 will be described as being performed by a system of one or more computers located in one or more locations. For example, a neural network training system, e.g., the neural network training system 100 of FIG. 1, appropriately programmed, can perform the process 200.

The system can repeatedly perform the process 200 to repeatedly update the values of the parameters of the controller neural network.

The system generates a batch of new output sequences using the controller neural network in accordance with the current values of the controller parameters (step 202). The batch generally includes a fixed number of output sequences, e.g., ten, fifty, or one hundred.

To generate each new output sequence, the system samples from the score distributions generated by the controller neural network, e.g., until a pre-determined end-of-sequence output token is sampled or until the sequence reaches a pre-determined maximum length. Because the system samples from the score distributions instead of selecting the highest scoring output at each time step, the new output sequences will generally all be different from one another even all the sequences are generated in accordance with the same parameter values.

The system obtains a respective reward for each new output sequence (step 204). As described above, the reward measures the quality of the new output sequence and the system can receive the reward from an external system, i.e., in response to providing the new output sequence for evaluation or can generate the reward by evaluating the quality of the new output sequence.

The system determines a priority queue parameter update and updates the priority queue based on the rewards for the new output sequences and the data currently in the priority queue (step 206). Determining the priority queue parameter update and updating the priority queue will be described in more detail below with reference to FIG. 3.

The system optionally determines a reinforcement learning parameter value update from the rewards for the new output sequences (step 208). In other words, the system determines another update to the current values of the controller parameters that increases the rewards received for output sequences generated by the controller neural networks using a reinforcement learning technique. For example, the reinforcement learning technique can be a policy gradient technique and the system can determine, e.g., through backpropagation, the gradient with respect to the network parameters of a REINFORCE objective that maximizes the average of the rewards for the new sequences. In some cases, the REINFORCE objective can be augmented with a baseline term, e.g., the exponential moving average of the rewards.

The system optionally also determines an entropy regularization parameter value update (step 210). In particular, the system can determine, e.g., through backpropagation, the gradient with respect to the network parameters of an entropy regularization term that encourages exploration of a space of possible output sequences by the controller neural network. The entropy regularization term aims to increase the uncertainty of the model and encourage exploration and is the gradient of the sum of the entropy of the score distributions generated by the controller neural network at each time step while generating (i) the new output sequences as described above, (ii) the current scores for the sequences in the priority queue as described above, or both.

The system applies the parameter update(s) to the current values of the controller parameters. In particular, the system can compute a sum or a weighted sum of the computed parameter updates and then apply the sum or weighted sum to the current values in accordance with the update rule being used to train the controller neural network, e.g., a learning rule, an ADAM update rule, or an RMSprop update rule.

Figure 3:
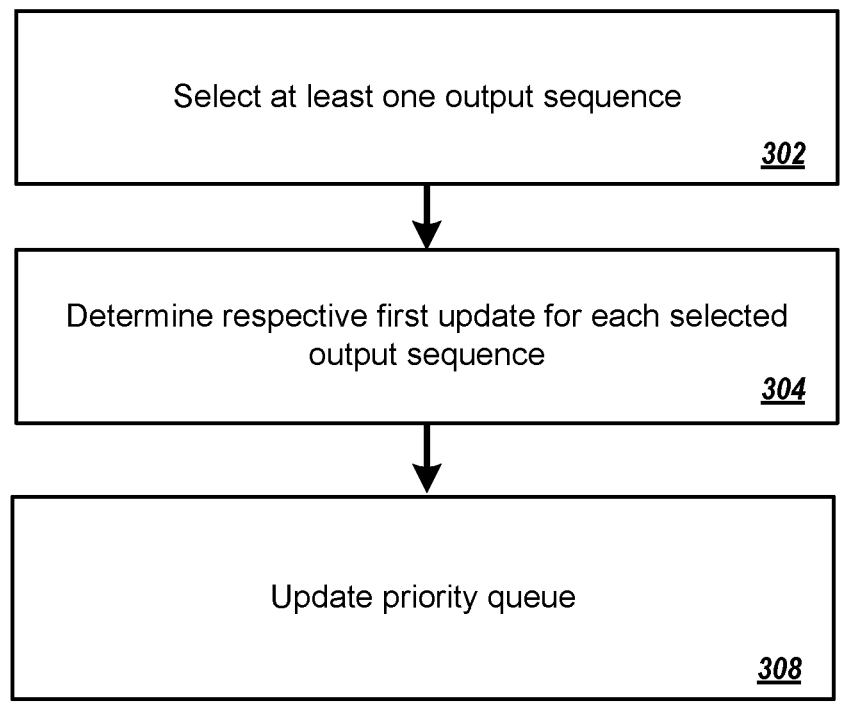
FIG. 3 is a flow chart of an example process for determining a priority queue parameter update and updating the priority queue.

FIG. 3 is a flow diagram of an example process 300 for determining a priority queue parameter update and updating the priority queue. For convenience, the process 300 will be described as being performed by a system of one or more computers located in one or more locations. For example, a neural network training system, e.g., the neural network training system 100 of FIG. 1, appropriately programmed, can perform the process 100.

The system can perform the process 300 for each iteration of the training process in order to repeatedly determine updates to the parameters of the controller neural network and to repeatedly update the priority queue.

The system selects at least one output sequence from the sequences currently in the priority queue (step 302). That is, the system selects at least one output sequence from the set of K output sequences that were previously generated by the controller neural network and that are currently in the priority queue. In some implementations, the system randomly samples a single output sequence from the K sequences. In some other implementations, the system selects all of the K sequences or some other fixed size subset of the K sequences.

For each selected output sequence, the system determines a respective score assigned to the selected output sequence by the controller neural network in accordance with current values of the controller parameters (step 304).

For example, when the controller neural network is a recurrent neural network, the system determines the respective score assigned to the selected output sequence by, for each particular time step of the plurality of time steps in the selected output sequence, providing the preceding output in the selected output sequence, i.e., the output at the time step preceding the particular time step, as input to the controller neural network to cause the controller neural generate a score distribution over possible outputs for the particular time step. The system then identifies the score assigned to the output that follows the preceding output in the selected output sequence, i.e., the output at the particular time step, by the score distribution for the time step. Once this has been done for all of the plurality of time steps, the system combines the identified scores for the plurality of time steps to generate the score assigned to the output sequence. For example, the assigned score can be the logarithm of the product of the identified scores at the time steps.

The system determines, for each selected sequence, a respective first update to the current values of the controller parameters that increases the score assigned to the selected output sequence by the controller neural network (step 306). In particular, the system determines, e.g., through backpropagation, the gradient with the respect to the network parameters of a priority queue objective that depends on the assigned score. In particular, in some cases the priority queue objective is simply the assigned score, i.e., the log likelihood of the selected sequence according to the current parameter values. When multiple output sequences were selected, the system combines, e.g., averages or sums, the respective first updates for each selected sequence to generate the priority queue parameter update for the iteration.

The system updates the priority queue based on the rewards for the sequences already in the priority queue and the rewards for the new output sequences that were generated as part of the current batch (step 308). In particular, the system determines, from the new output sequences and the output sequences in the maintained data, i.e., currently in the priority queue, the K output sequences that have the highest rewards. The system then modifies the maintained data, i.e., the priority queue, to identify the determined K output sequences and the respective reward for each of the K output sequences. In other words, the system removes from the priority queue any sequence that is not in the K sequences with the highest rewards and adds to the priority queue any new sequence that is in the K sequences with the highest rewards. If two of the sequences within the sequences with the K highest rewards are duplicates, the system removes one of the duplicate sequences from consideration.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by a system of one or more computers and for training a controller neural network having a plurality of controller parameters to generate output sequences by determining trained values of the controller parameters from initial values of the controller parameters, the method comprising:

maintaining data identifying a set of K output sequences that were previously generated by the controller neural network during the training and, for each output sequence in the set, a respective reward that measures a quality of the output sequence, wherein K is an integer greater than one;

selecting at least one of the output sequences from the set of output sequences;

for each selected output sequence, determining a respective score assigned to the selected output sequence by the controller neural network in accordance with current values of the controller parameters;

determining, for each selected sequence, a respective first update to the current values of the controller parameters that increases the score assigned to the selected output sequence by the controller neural network;

generating a batch of new output sequences using the controller neural network in accordance with the current values of the controller parameters;

obtaining a respective reward for each of the new output sequences;

determining, from the new output sequences and the output sequences in the maintained data, the K output sequences that have the highest rewards; and modifying the maintained data to identify the determined K output sequences and the respective reward for each of the K output sequences.

2. The method of claim 1, wherein determining, for each selected sequence, a respective first update to the current values of the controller parameters that increases the score assigned to the selected output sequence by the controller neural network comprises:

determining a gradient of a priority queue objective function that depends on a logarithm of the score assigned to the selected sequence by the neural network.

3. The method of claim 1, wherein selecting at least one of the output sequences from the set of output sequences comprises: selecting all of the output sequences in the set.

4. The method of claim 1, wherein selecting at least one of the output sequences from the set of output sequences comprises: selecting a random output sequence from the set.

5. The method of claim 1, further comprising:
determining a second update to the current values of the controller parameters that increases the rewards received for output sequences generated by the controller neural networks using a reinforcement learning technique.

6. The method of claim 5, wherein the reinforcement learning technique is a policy gradient technique.

7. The method of claim 1, further comprising:
determining a third update to the current values of the controller parameters by determining a gradient of an entropy regularization term that encourages exploration of a space of possible output sequences by the controller neural network.

8. The method of claim 1, wherein the controller neural network is a recurrent neural network that is configured to, at each of a plurality of time steps:
receive as input a preceding output in the output sequence; and
process the preceding output in accordance with the controller parameters to generate a score distribution over possible outputs at the time step.

9. The method of claim 8, wherein determining a respective score assigned to the selected output sequence by the controller neural network in accordance with current values of the controller parameters comprises:
for each of the plurality of time steps:
providing the preceding output in the selected output sequence as input to the controller neural network to generate a score distribution over possible outputs; and
identifying the score assigned to the output that follows the preceding output in the selected output sequence by the score distribution for the time step; and
combining the identified scores for the plurality of time steps.

10. The method of claim 1, wherein the output sequences are sequences of computer program tokens and the reward measures how well a computer program defined by an output sequence performs a computer programming task.

11. The method of claim 1, wherein the output sequences are sequences of values of neural network architecture hyperparameters, and wherein the reward measures how well a neural network having an architecture defined by the output sequence performs on a neural network task.

12. The method of claim 1, wherein the output sequences are sequences of values of hyperparameters of a machine learning training process, and wherein the reward measures how well a neural network performs after being trained using the machine learning training process using the hyperparameters defined by the training process.

13. A system comprising one or more computers and one or more storage devices storing instructions that when executed by the one or more computers cause the one or more computers to perform operations for training a controller neural network having a plurality of controller parameters to generate output sequences by determining trained values of the controller parameters from initial values of the controller parameters, the operations comprising:
maintaining data identifying a set of K output sequences that were previously generated by the controller neural network during the training and, for each output sequence in the set, a respective reward that measures a quality of the output sequence, wherein K is an integer greater than one;
selecting at least one of the output sequences from the set of output sequences;
for each selected output sequence, determining a respective score assigned to the selected output sequence by the controller neural network in accordance with current values of the controller parameters;
determining, for each selected sequence, a respective first update to the current values of the controller parameters that increases the score assigned to the selected output sequence by the controller neural network;
generating a batch of new output sequences using the controller neural network in accordance with the current values of the controller parameters;
obtaining a respective reward for each of the new output sequences;
determining, from the new output sequences and the output sequences in the maintained data, the K output sequences that have the highest rewards; and
modifying the maintained data to identify the determined K output sequences and the respective reward for each of the K output sequences.

14. The system of claim 13, wherein determining, for each selected sequence, a respective first update to the current values of the controller parameters that increases the score assigned to the selected output sequence by the controller neural network comprises:
determining a gradient of a priority queue objective function that depends on a logarithm of the score assigned to the selected sequence by the neural network.

15. The system of claim 13, wherein selecting at least one of the output sequences from the set of output sequences comprises: selecting all of the output sequences in the set.

16. The system of claim 13, wherein selecting at least one of the output sequences from the set of output sequences comprises: selecting a random output sequence from the set.

17. The system of claim 13, the operations further comprising:
determining a second update to the current values of the controller parameters that increases the rewards received for output sequences generated by the controller neural networks using a reinforcement learning technique.

18. One or more non-transitory computer-readable storage media storing instructions that when executed by one or more computers cause the one or more computers to perform operations for training a controller neural network having a plurality of controller parameters to generate output sequences by determining trained values of the controller parameters from initial values of the controller parameters, the operations comprising:
maintaining data identifying a set of K output sequences that were previously generated by the controller neural network during the training and, for each output sequence in the set, a respective reward that measures a quality of the output sequence, wherein K is an integer greater than one;
selecting at least one of the output sequences from the set of output sequences;

for each selected output sequence, determining a respective score assigned to the selected output sequence by the controller neural network in accordance with current values of the controller parameters;

determining, for each selected sequence, a respective first update to the current values of the controller parameters that increases the score assigned to the selected output sequence by the controller neural network;

generating a batch of new output sequences using the controller neural network in accordance with the current values of the controller parameters;

obtaining a respective reward for each of the new output sequences;

determining, from the new output sequences and the output sequences in the maintained data, the K output sequences that have the highest rewards; and modifying the maintained data to identify the determined K output sequences and the respective reward for each of the K output sequences.

19. The computer-readable storage media of claim 18, wherein determining, for each selected sequence, a respective first update to the current values of the controller parameters that increases the score assigned to the selected output sequence by the controller neural network comprises:

determining a gradient of a priority queue objective function that depends on a logarithm of the score assigned to the selected sequence by the neural network.

20. The computer-readable storage media of claim 18, the operations further comprising:

determining a second update to the current values of the controller parameters that increases the rewards received for output sequences generated by the controller neural networks using a reinforcement learning technique.

* * * * *